(12) United States Patent
Wuidart et al.

(10) Patent No.: US 8,130,159 B2
(45) Date of Patent: Mar. 6, 2012

(54) ELECTROMAGNETIC FIELD GENERATION ANTENNA FOR A TRANSPONDER

(75) Inventors: Luc Wuidart, Pourrieres (FR); Michel Bardouillet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 12/560,184

(22) Filed: Sep. 15, 2009

(65) Prior Publication Data

US 2010/0039337 A1 Feb. 18, 2010

Related U.S. Application Data

(63) Continuation of application No. 10/344,880, filed as application No. PCT/FR01/02621 on Aug. 16, 2001, now abandoned.

(30) Foreign Application Priority Data

Aug. 17, 2000 (FR) ...................................... 00/10699

(51) Int. Cl.
*H01Q 9/00* (2006.01)
(52) U.S. Cl. ........ 343/749; 343/742; 343/745; 343/866; 343/867; 340/572.1
(58) Field of Classification Search .................. 343/742, 343/745, 749, 866, 867; 340/572.1, 572.7
See application file for complete search history.

(56) References Cited

U.S. PATENT DOCUMENTS

| | | |
|---|---|---|
| 2,411,555 A | 11/1946 | Rogers |
| 3,618,089 A | 11/1971 | Moran, Jr. |
| 4,068,232 A | 1/1978 | Meyers et al. |
| 4,209,783 A | 6/1980 | Ohyama et al. |
| 4,258,348 A | 3/1981 | Belfer et al. |
| 4,278,977 A | 7/1981 | Nossen |
| 4,375,289 A | 3/1983 | Schmall et al. |
| 4,408,185 A | 10/1983 | Rasmussen |
| 4,593,412 A | 6/1986 | Jacob |
| 4,656,472 A | 4/1987 | Walton |
| 4,660,192 A | 4/1987 | Pomatto, Sr. |
| 4,673,932 A | 6/1987 | Ekchian et al. |
| 4,706,050 A | 11/1987 | Andrews |
| 4,782,308 A | 11/1988 | Trobec et al. |
| 4,802,080 A | 1/1989 | Bossi et al. |
| 4,814,595 A | 3/1989 | Gilboa |
| 4,827,266 A | 5/1989 | Sato et al. |
| 4,928,108 A | 5/1990 | Kropielnicki et al. |

(Continued)

FOREIGN PATENT DOCUMENTS

DE 28 35 549 A1 3/1979

(Continued)

OTHER PUBLICATIONS

International Search Report from International Application No. PCT/FR01/02621 filed Aug. 16, 2001.

(Continued)

*Primary Examiner* — Dieu Duong
(74) *Attorney, Agent, or Firm* — Wolf, Greenfield & Sacks, P.C.

(57) ABSTRACT

An antenna generating an electromagnetic field for an electromagnetic transponder and a terminal provided with such an antenna. The antenna comprises a first inductive element designed to be connected to two terminals employing an energizing voltage, and a parallel resonant circuit coupled with the first inductive element.

32 Claims, 2 Drawing Sheets

U.S. PATENT DOCUMENTS

| | | | |
|---|---|---|---|
| 4,963,887 A | 10/1990 | Kawashima et al. | |
| 5,013,898 A | 5/1991 | Glasspool | |
| 5,055,853 A | 10/1991 | Garnier | |
| 5,084,699 A | 1/1992 | DeMichele | |
| 5,099,227 A | 3/1992 | Geiszler et al. | |
| 5,113,184 A | 5/1992 | Katayama | |
| 5,126,749 A | 6/1992 | Kaltner | |
| 5,142,292 A | 8/1992 | Chang | |
| 5,202,644 A | 4/1993 | Brady | |
| 5,214,409 A | 5/1993 | Beigel | |
| 5,235,326 A | 8/1993 | Beigel et al. | |
| 5,305,008 A | 4/1994 | Turner et al. | |
| 5,324,315 A | 6/1994 | Grevious | |
| 5,382,952 A | 1/1995 | Miller | |
| 5,396,251 A | 3/1995 | Schuermann | |
| 5,440,594 A | 8/1995 | Lechleider | |
| 5,451,958 A | 9/1995 | Schuermann | |
| 5,452,344 A | 9/1995 | Larson | |
| 5,493,267 A | 2/1996 | Ahlse et al. | |
| 5,504,485 A | 4/1996 | Landt et al. | |
| 5,517,194 A | 5/1996 | Carroll et al. | |
| 5,519,381 A | 5/1996 | Marsh et al. | |
| 5,521,602 A | 5/1996 | Carroll et al. | |
| 5,525,993 A | 6/1996 | Pobanz et al. | |
| 5,541,604 A | 7/1996 | Meier | |
| 5,550,536 A | 8/1996 | Flaxl | |
| 5,574,470 A * | 11/1996 | de Vall | 343/895 |
| 5,604,411 A | 2/1997 | Venkitasubrahmanian et al. | |
| 5,619,529 A | 4/1997 | Fujioka | |
| 5,621,411 A | 4/1997 | Hagl et al. | |
| 5,691,605 A | 11/1997 | Xia et al. | |
| 5,698,837 A | 12/1997 | Furuta | |
| 5,698,838 A | 12/1997 | Yamaguchi | |
| 5,701,121 A | 12/1997 | Murdoch | |
| 5,703,573 A | 12/1997 | Fujimoto et al. | |
| 5,767,503 A | 6/1998 | Gloton | |
| 5,801,372 A | 9/1998 | Yamaguchi | |
| 5,831,257 A | 11/1998 | Yamaguchi | |
| 5,850,416 A | 12/1998 | Myer | |
| 5,874,725 A | 2/1999 | Yamaguchi | |
| 5,883,582 A | 3/1999 | Bowers et al. | |
| 5,889,273 A | 3/1999 | Goto | |
| 5,903,150 A | 5/1999 | Roznitsky | |
| 5,905,444 A | 5/1999 | Zimmer | |
| 5,940,006 A | 8/1999 | MacLellan et al. | |
| 5,955,950 A | 9/1999 | Gallagher, III et al. | |
| 6,014,088 A | 1/2000 | Van Santbrink et al. | |
| 6,025,780 A | 2/2000 | Bowers et al. | |
| 6,028,503 A | 2/2000 | Preishuberpflügl et al. | |
| 6,034,640 A | 3/2000 | Oida et al. | |
| 6,070,803 A | 6/2000 | Stobbe | |
| 6,070,804 A | 6/2000 | Miyamoto | |
| 6,072,383 A | 6/2000 | Gallagher, III et al. | |
| 6,075,491 A | 6/2000 | Dakeya et al. | |
| 6,079,622 A | 6/2000 | Goto | |
| 6,100,788 A | 8/2000 | Frary | |
| 6,127,929 A | 10/2000 | Roz | |
| 6,137,411 A | 10/2000 | Tyren | |
| 6,147,605 A | 11/2000 | Vega et al. | |
| 6,150,986 A | 11/2000 | Sandberg et al. | |
| 6,154,635 A | 11/2000 | Ohta | |
| 6,172,608 B1 | 1/2001 | Cole | |
| 6,208,235 B1 | 3/2001 | Trontelj | |
| 6,229,443 B1 | 5/2001 | Roesner | |
| 6,243,013 B1 | 6/2001 | Duan et al. | |
| 6,249,212 B1 | 6/2001 | Beigel et al. | |
| 6,272,320 B1 | 8/2001 | Nandra et al. | |
| 6,272,321 B1 | 8/2001 | Bruhnke et al. | |
| 6,281,794 B1 | 8/2001 | Duan et al. | |
| 6,304,169 B1 | 10/2001 | Blama et al. | |
| 6,307,468 B1 | 10/2001 | Ward, Jr. | |
| 6,307,517 B1 | 10/2001 | Lee | |
| 6,335,665 B1 | 1/2002 | Mendelsohn | |
| 6,356,738 B1 | 3/2002 | Schneider et al. | |
| 6,378,774 B1 * | 4/2002 | Emori et al. | 235/492 |
| 6,393,045 B1 | 5/2002 | Belcher et al. | |
| 6,398,710 B1 | 6/2002 | Ishikawa et al. | |
| 6,424,820 B1 | 7/2002 | Burdick et al. | |
| 6,441,804 B1 | 8/2002 | Hsien | |
| 6,446,049 B1 | 9/2002 | Janning et al. | |
| 6,465,903 B1 | 10/2002 | Wuidart et al. | |
| 6,473,028 B1 | 10/2002 | Luc | |
| 6,476,709 B1 | 11/2002 | Wuidart et al. | |
| 6,483,426 B1 | 11/2002 | Pagnol et al. | |
| 6,491,230 B1 | 12/2002 | Dubost et al. | |
| 6,498,923 B2 | 12/2002 | Ikefuji et al. | |
| 6,547,149 B1 | 4/2003 | Wuidart et al. | |
| 6,617,962 B1 | 9/2003 | Horwitz et al. | |
| 6,646,543 B1 | 11/2003 | Mardinian et al. | |
| 6,650,226 B1 | 11/2003 | Wuidart et al. | |
| 6,650,227 B1 | 11/2003 | Bradin | |
| 6,650,229 B1 | 11/2003 | Wuidart et al. | |
| 6,654,466 B1 | 11/2003 | Ikefuji et al. | |
| 6,685,096 B1 | 2/2004 | Degrauwe et al. | |
| 6,690,229 B2 | 2/2004 | Rudolph | |
| 6,703,921 B1 | 3/2004 | Wuidart et al. | |
| 6,731,198 B1 | 5/2004 | Stobbe et al. | |
| 6,762,683 B1 | 7/2004 | Giesler | |
| 6,778,070 B1 | 8/2004 | Thomas | |
| 2002/0008611 A1 | 1/2002 | Wuidart | |
| 2003/0098783 A1 | 5/2003 | Pagnol | |
| 2003/0227323 A1 | 12/2003 | Enguent | |
| 2004/0113790 A1 | 6/2004 | Hamel et al. | |

FOREIGN PATENT DOCUMENTS

| | | |
|---|---|---|
| DE | 44 44 984 C1 | 12/1994 |
| DE | 195 46 928 A1 | 6/1997 |
| DE | 196 21 076 A1 | 11/1997 |
| DE | 196 32 282 A1 | 2/1998 |
| EP | 0 038 877 A1 | 11/1981 |
| EP | 0 333 388 A2 | 9/1989 |
| EP | 0 369 622 A2 | 5/1990 |
| EP | 0 568 067 A1 | 11/1993 |
| EP | 0 579 332 A1 | 1/1994 |
| EP | 0 645 840 A1 | 3/1995 |
| EP | 0 768 540 A1 | 4/1997 |
| EP | 0 857 981 A1 | 8/1998 |
| EP | 0 902 475 A2 | 3/1999 |
| FR | 2 114 026 | 6/1972 |
| FR | 2 746 200 | 9/1997 |
| FR | 2 757 952 | 7/1998 |
| GB | 2 298 553 A | 9/1996 |
| GB | 2 321 726 A | 8/1998 |
| JP | 407245946 A | 9/1995 |
| JP | 10-145267 | 5/1998 |
| JP | 10-203066 | 8/1998 |
| WO | WO 93/17482 A3 | 9/1993 |
| WO | WO 97/49076 A | 12/1997 |
| WO | WO 98-20363 A1 | 5/1998 |
| WO | WO 99/33017 A1 | 7/1999 |
| WO | WO 99/43096 A1 | 8/1999 |

OTHER PUBLICATIONS

French Search Report from French Patent Application No. 98 08024, filed Jun. 22, 1998.
French Search Report from French Patent Application No. 98 08025, filed Jun. 22, 1998.
French Search Report from French Patent Application No. 99 04544, filed Apr. 7, 1999.
French Search Report from French Patent Application No. 99 04545, filed Apr. 7, 1999.
French Search Report from French Patent Application No. 99 04546, filed Apr. 7, 1999.
French Search Report from French Patent Application No. 99 04547, filed Apr. 7, 1999.
French Search Report from French Patent Application No. 99 04548, filed Apr. 7, 1999.
French Search Report from French Patent Application No. 99 04549, filed Apr. 7, 1999.
French Search Report from French Patent Application No. 99 07024, filed May 31, 1999.
French Search Report from French Patent Application No. 99 09563, filed Jul. 20, 1999.
French Search Report from French Patent Application No. 99 09564, filed Jul. 20, 1999.

French Search Report from French Patent Application No. 00 01214, filed Jan. 31, 2000.
French Search Report from French Patent Application No. 00 06061, filed May 12, 2000.
French Search Report from French Patent Application No. 00 06064, filed May 12, 2000.
French Search Report from French Patent Application No. 00 06065, filed May 12, 2000.
French Search Report from French Patent Application No. 00 06071, filed May 12, 2000.
French Search Report from French Patent Application No. 00 06301, filed May 17, 2000.
French Search Report from French Patent Application No. 00 06302, filed May 17, 2000.
International Search Report from International Patent Application No. PCT/FR 01 02591, filed Aug. 9, 2001.
Translation of the International Preliminary Examination Report from priority application No. PCT/FR01/02521.

* cited by examiner

ELECTROMAGNETIC FIELD GENERATION ANTENNA FOR A TRANSPONDER

CROSS REFERENCE TO RELATED APPLICATIONS

This application is a continuation of U.S. patent application Ser. No. 10/344,880, filed on Feb. 14, 2003, entitled "ELECTROMAGNETIC FIELD GENERATION ANTENNA FOR A TRANSPONDER," which application is a U.S. National Stage application of International Application serial No. PCT/FR2001/02621, filed on Aug. 16, 2001, entitled "ANTENNA GENERATING AN ELECTROMAGNETIC FIELD FOR TRANSPONDER," which application claims priority benefit of French patent application number 00/10699, filed on Aug. 17, 2000, entitled "ANTENNA GENERATING AN ELECTROMAGNETIC FIELD FOR TRANSPONDER," which applications are hereby incorporated by reference to the maximum extent allowable by law.

BACKGROUND OF THE INVENTION

1. Field of the Invention

The present invention relates to systems using electromagnetic transponders, that is, transmitters and/or receivers (generally mobile) capable of being interrogated in a contactless and wireless manner by a unit (generally fixed), called a read and/or write terminal. Generally, transponders extract the power supply required by the electronic circuits included therein from the high-frequency field radiated by an antenna of the read-write terminal. The present invention more specifically relates to a read and/or write terminal for electromagnetic transponders as well as to the antenna that it includes.

2. Discussion of the Related Art

FIG. 1 very schematically shows a conventional example of a read/write terminal 1 associated with a transponder 10.

Generally, terminal 1 is essentially formed of a series oscillating circuit formed of an inductance L1 in series with a capacitor C1 and a resistor R1. This oscillating circuit is controlled by a device 2 including, among others, an amplifier or antenna coupler and a control circuit exploiting the received data provided, in particular, with a modulator/demodulator and a microprocessor for processing the control signals and the data. The oscillating circuit is excited by a voltage Vg provided by device 2 between terminals 3 and 4. Circuit 2 generally communicates with different input/output circuits (keyboard, screen, means of exchange with a server, etc.) and/or processing circuits, not shown. The circuits of the read/write terminal draw the power necessary to their operation from a supply circuit (not shown) connected, for example, to the electric supply system.

A transponder 10, intended for cooperating with a terminal 1, essentially includes a parallel oscillating circuit. This circuit is formed of an inductance L2 in parallel with a capacitor C2 between two input terminals 11, 12 of a control and processing circuit 13. Terminals 11, 12 are in practice connected to the input of a rectifying means (not shown), the outputs of which form D.C. supply terminals of the circuits internal to transponder 10. These circuits generally include, essentially, a microprocessor, a memory, a demodulator of the signals that may be received from terminal 1, and a modulator for transmitting information to the terminal.

The oscillating circuits of the terminal and of the transponder are generally tuned on a same frequency corresponding to the frequency of excitation signal Vg of the terminal's oscillating circuit. This high-frequency signal (for example, at 13.56 MHz) is not only used as a carrier of data transmission from the terminal to the transponder, but also as a remote supply carrier for the transponders located in the terminal's field. When a transponder 10 is located in the field of a terminal 1, a high-frequency voltage is generated across terminals 11 and 12 of the transponder's resonant circuit. This voltage, after being rectified and possibly clipped, provides the supply voltage of electronic circuits 13 of the transponder.

The high-frequency carrier transmitted by the terminal is generally modulated in amplitude by said terminal according to different coding techniques to transmit data and/or control signals to one or several transponders in the field. In return, the data transmission from the transponder to a terminal is generally performed by modulating the load formed by resonant circuit L2, C2. The load variation is performed at the rate of a sub-carrier having a frequency (for example, 847.5 kHz) smaller than that of the carrier. This load variation can then be detected by the terminal as an amplitude variation or as a phase variation by means, for example, of a measurement of the voltage across capacitor C1 or of current Ig in the oscillating circuit. In FIG. 1, the measurement signal has been symbolized by a connection 5 in dotted lines connecting the midpoint of the series connection of inductance L1 and capacitor C1 to circuit 2.

A problem which arises in conventional transponder systems is that they generally have a limited range. The system range corresponds to the limiting distance beyond which the field sensed by a transponder is too small to enable extraction of the power necessary for its operation therefrom. The limited range is essentially due to the maximum admissible magnetic field, which is set by standards. Conventionally, to increase the range, the diameter of the antenna is desired to be increased, to avoid exceeding this maximum allowed magnetic field. Now, increasing the diameter amounts to increasing excitation current Ig in proportions that are not desirable, among others, for power consumption reasons.

SUMMARY OF THE INVENTION

An object of the present invention is to improve the range of electromagnetic transponder read/write terminals.

The present invention more specifically aims at providing a novel long-range electromagnetic field generation antenna.

The present invention also aims at requiring no modification of the transponders and, accordingly, at being able to operate with any conventional transponder.

The present invention also aims at reducing or minimizing the power consumption of the terminal.

To achieve these and other objects, the present invention provides an antenna for generating an electromagnetic field for an electromagnetic transponder, including a first inductive element intended for being connected to two terminals of application of an excitation voltage, and a parallel resonant circuit coupled with the first inductive element.

According to an embodiment of the present invention, said resonant circuit includes a second inductive element, the value of which is chosen to be greater than the value of the first inductive element with a ratio depending on a desired field amplification.

According to an embodiment of the present invention, the first inductive element is formed of several inductances associated in a network.

According to an embodiment of the present invention, the inductive element(s) are formed of planar windings.

According to an embodiment of the present invention, the two inductive elements are in parallel planes.

According to an embodiment of the present invention, the distance that separates the respective planes of the inductive elements is chosen according to the power consumption of the transponders for which the antenna is intended and to the desired range.

The present invention also provides a terminal for generating a high-frequency electromagnetic field for at least one transponder entering this field, the terminal including a resonant circuit, magnetically coupled to an excitation circuit including a first inductive element and having no capacitive element.

According to an embodiment of the present invention, the resonant circuit is formed of a second inductive element and of a capacitive element in parallel, and is tuned to the frequency of an excitation signal of the first inductive element.

According to an embodiment of the present invention, said resonant circuit includes a control switch.

The foregoing objects, features and advantages of the present invention, will be discussed in detail in the following non-limiting description of specific embodiments in connection with the accompanying drawings.

DETAILED DESCRIPTION

Figure 1:
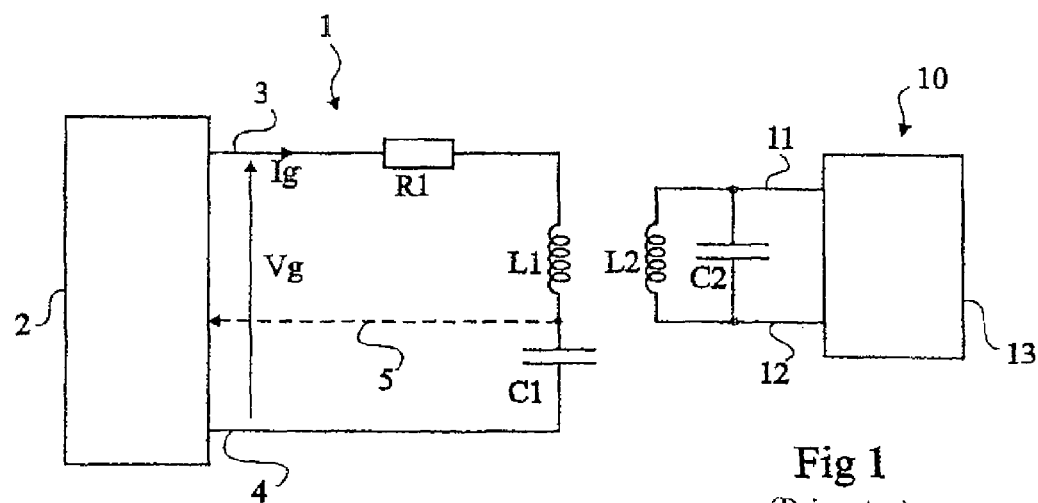
FIG. 1, previously described, shows a conventional example of a transponder system of the type to which the present invention applies.

The same elements have been referred to with the same references in the different drawings. For clarity, only those elements which are necessary to the understanding of the present invention have been illustrated in the drawings and will be described hereafter. In particular, the internal structures of the electronic circuits of a transponder and of a read and/or write terminal have not been detailed.

A feature of the present invention is to provide the antenna of a read and/or write terminal in the form of an LR circuit coupled to a resonant LC circuit. According to the present invention, the LR circuit is excited by the high-frequency generator of the terminal. The excitation frequency is, conventionally, that of the remote supply carrier and of the possible data to be transmitted. The resonant circuit forms a rejector circuit formed of an inductance and of a capacitor. It is in practice an RLC circuit with as small a resistance as possible corresponding to the series resistances of the inductance and of the capacitor.

Another feature of the present invention is to provide a value of the inductance of the rejector circuit greater than that of the LR excitation circuit. Thus, the voltage developed across the capacitor of the rejector circuit is greater than the excitation voltage of the LR circuit. According to the present invention, the quality factor of the rejector circuit is desired to be increased or maximized to favor the amplification created by its coupling with the LR excitation circuit. The quality factor is inversely proportional to the sum of the series resistances and to the square root of the capacitance of the rejector circuit, and directly proportional to the square root of its inductance. Accordingly, the inductance is desired to be increased or maximized and the series resistances and the capacitance are desired to be reduced or minimized.

Figure 2:
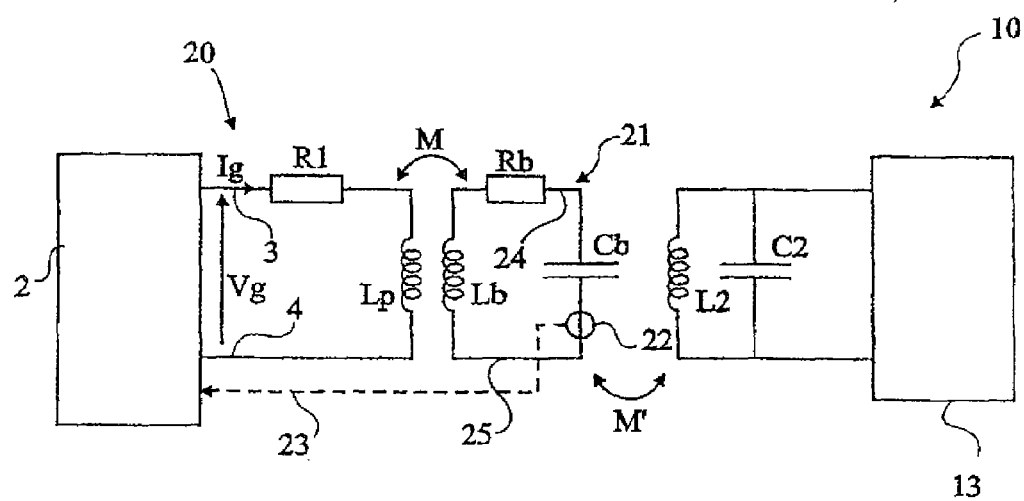
FIG. 2, schematically shows a first embodiment of a read and/or write terminal, provided with an antenna according to the present invention, and associated with a conventional transponder.

FIG. 2 schematically shows a first embodiment of a read and/or write terminal according to the present invention.

Conventionally, a terminal 20 according to the present invention includes circuits 2 for processing, controlling, and analyzing data to be exchanged with a transponder 10, also conventional. A high-frequency voltage Vg used as a remote power supply carrier and/or as a modulation carrier for a transponder is provided across output terminals 3 and 4 of circuit 2. According to the present invention, terminals 3 and 4 are connected to a series LR circuit formed of a resistor R1 in series with an inductance Lp. Inductance Lp is intended to be coupled with an inductance Lb of a rejector circuit 21 associated with the LR circuit. Circuit 21 also includes a capacitor Cb, the two electrodes of which are respectively connected to the two terminals 24 and 25 of inductance Lb. According to the present invention, the inductive LR circuit, connected across terminals 3 and 4 of circuit 2, includes no capacitor. Thus, there is no tuning of the excitation circuit on the remote supply carrier frequency. According to the present invention, this tuning is transferred to rejector circuit 21. For the latter, the respective values of inductance Lb and of capacitance Cb are selected so that the resonance frequency of this circuit corresponds to the remote supply carrier of the system (for example, 13.56 MHz).

According to the present invention, inductances Lp and Lb are, preferably, made in the form of planar inductances having one or several spirals. The inductances are placed in parallel planes to increase or maximize the magnetic coupling between them. This coupling is symbolized in FIG. 2 by mutual inductance M between the LR and LC circuits. Transponder 10 is a conventional transponder, the present invention requiring no modification of the transponder for its implementation. When transponder 10 is present in the terminal's field, it is in magnetic coupling (mutual inductance M') with the rejector circuit, from which it draws the power necessary to its operation.

The fact of placing a transponder in the antenna's field amounts to increasing the series resistance of rejector circuit 21, and thus reduces its quality factor and the current flow therethrough. This causes power consumption on the side of excitation circuit R1-Lp. However, the terminal's generator can just provide an energizing current to the rejector circuit where the current and the voltage are naturally high.

Inductance Lp is chosen to be as small as possible to improve or optimize the system efficiency and maximize the use of the installed power of the generator providing voltage Vg. The value of inductance Lb of rejector circuit 21 is chosen to be as high as possible to increase or maximize the system range. Indeed, the higher ratio Lb/Lp, the greater the ratio between the voltage developed across capacitor Cb and voltage Vg.

According to a preferred embodiment of the present invention, the interval between the planar inductances, arranged in parallel planes, is adapted to the transponders for which the terminal is intended. According to the charge level represented by different transponders (in particular, according to whether they include or not a microprocessor) and according to the desired range, the coupling between the excitation and rejector circuits can be improved or optimized. In the case of low-power consumption transponders and where a large range is desired, the antenna's inductances will be drawn away from each other to increase or maximize the overvoltage generated across the rejector circuit. For example, an interval ranging between approximately 0.5 cm and a few centimeters will be selected. Conversely, for transponders having a higher power consumption, the coupling between inductances must be maximized so that the load represented by the transponders does not alter too much the quality factor of the rejector circuit. The antenna's inductances are then placed as close as possible to each other. The interval of course depends, among others, on the diameter of the inductances and on the quality coefficient of the rejector circuit.

An advantage of the present invention is that it enables increasing the range of a read and/or write terminal for a given voltage Vg and excitation current Ig.

Another advantage of the present invention is that it requires no modification of existing transponders.

The detection of a back modulation coming from a transponder can be performed either on the LR circuit or in LC circuit 21. In the embodiment of FIG. 2, a current transformer 22 having the function of measuring the current in rejector circuit 21 has been symbolized. A connection 23 provides the result of this measurement to circuit 2. As an alternative, the measurement may be performed in the LR circuit. However, it is easier to detect variations in the rejector circuit where the signal levels are higher. It will however be ascertained that this measurement disturbs as little as possible the quality factor of the rejector circuit. For example, if a voltage measurement is performed across capacitor Cb, it will be ascertained to use a measurement element with a high input impedance.

The present invention enables increasing the transmitted magnetic field without increasing either the current provided by the generator or voltage Vg, and thus without increasing the installed terminal power. For a same terminal with a given installed power, the present invention enables easy use of antennas of large dimensions, which is difficult with conventional terminals without increasing the generator voltage to provide the sufficient current.

Another advantage of the present invention is that it eases the impedance matching of the antenna with respect to control circuit 2. Indeed, the impedance Zpeq seen by the generator (circuit 2) providing the high-frequency excitation voltage can be generally written as:

$$Zpeq = Rp + j \cdot Xp,$$

where Rp represents the following real part:

$$Rp = \frac{\omega^2 \cdot k_{pb}^2 \cdot Lp \cdot Lb}{Rb}, \text{ and}$$

where Xp represents the following imaginary part:

$$Xp = \omega \cdot Lp,$$

with $k_{pb}$ representing the magnetic coupling coefficient between the excitation and rejector circuits, and Rb representing the equivalent resistance of circuit 21 (sum of the parasitic resistances of capacitor Cb and of inductance Lb). In real part Rp, no account has been taken of resistance R1, which corresponds in practice to the output resistance of the excitation generator. The series resistance of inductance Lp has further been neglected. The taking into account of these resistive elements merely amounts to adding their respective values to resistance Rb indicated hereabove.

To adapt the antenna's impedance, the ratio between inductances Lb and Lp may, for example, be modified, or a resistor may be introduced in parallel in circuit 21.

Further, imaginary part Xp of impedance Zpeq is a function of inductance Lp, which is reduced or minimized. Accordingly, the impedance may, as a first approximation, be considered as being purely resistive. It is thus particularly easy to obtain an off-load impedance matching (for example, at 50Ω). An advantage then is that the antenna of the read/write terminal can be easily moved aside from its control circuits. A 50-Ω matched impedance cable is sufficient. Of course, when a transponder is present in the field, it has an influence upon the impedance seen by the generator (at the denominator of the real part).

Figure 3A:
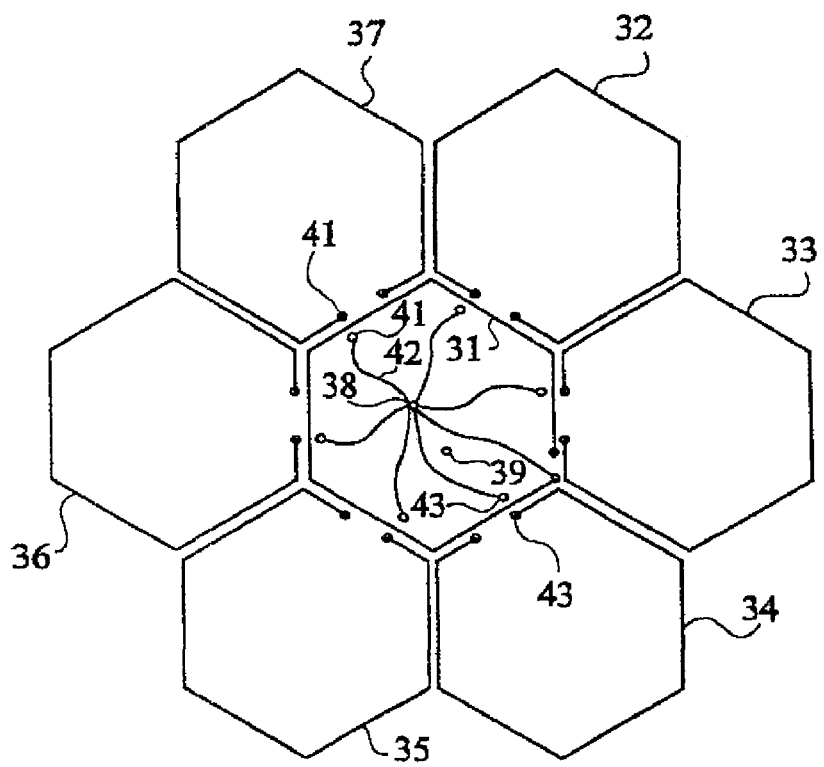
FIGS. 3A and 3B show an antenna according to a second embodiment of the present invention.
Figure 3B:
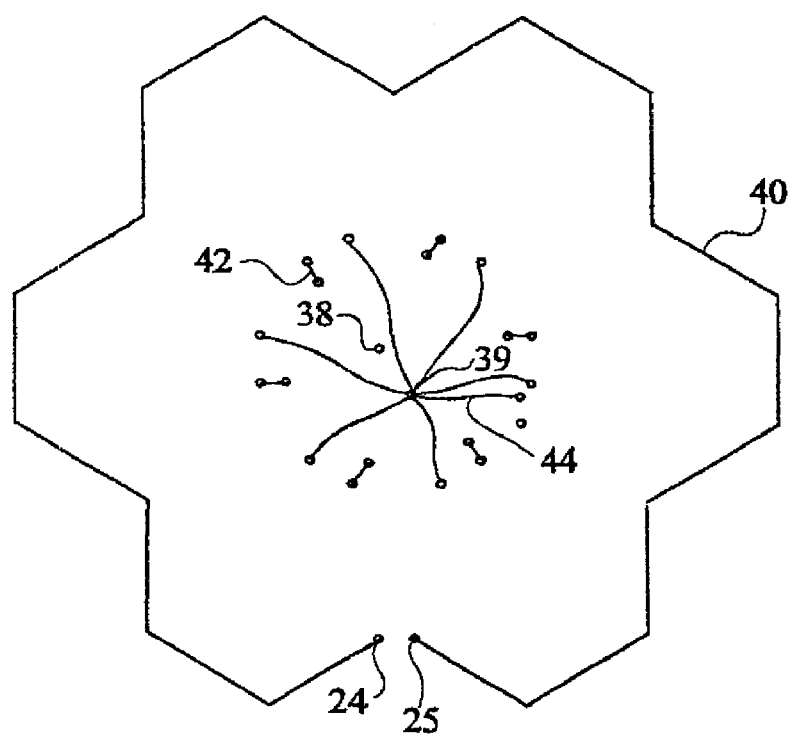

FIGS. 3A and 3B show the two sides of an antenna according to a preferred embodiment of the present invention. According to this preferred embodiment, inductive excitation element Lp is formed of several inductances 31, 32, 33, 34, 35, 36, and 37 in a network, that is, electrically in parallel. Inductances 31, 32, 33, 34, 35, 36, and 37 are coplanar. The inductances are, preferably, distributed in a honeycomb. Each inductance 31, 32, 33, 34, 35, 36, and 37 includes, for example, a single hexagonal spiral. The number of spirals of these inductances may be adapted to the value desired for the resulting inductive element Lp. Terminals 38 and 39 of interconnection of the respective terminals of inductances 31 to 37 form the terminals of element Lp. The inductances are for example formed by depositions of conductive tracks on a printed circuit wafer. A first end of each inductance is connected to terminal 38. This connection is performed by means of vias 41 and of conductive tracks 42 of the two wafer surfaces (FIGS. 3A and 3B). The second end of each inductance is connected to terminal 39 by means of vias 43 and of tracks 44.

The network association of the inductances must be such that all inductances in the network generate fields, the lines of which add (all are in the same direction).

Inductance Lb is formed on the second wafer surface. In this preferred embodiment, this inductance is formed of a single spiral 40 approximately delimiting a surface equivalent to that of all the network-connected spirals of inductive element Lp. It thus follows the external contour of the honeycomb. The end terminals of spiral 40 define terminals 24 and 25 of inductance Lb intended for being connected to capacitor Cb (not shown).

An advantage of using a network inductive element on the side of the LR circuit is that the voltage and current ratio is increased or maximized between the rejector circuit and the excitation circuit. Indeed, the ratio between the inductances of the rejector circuit and of the excitation circuit is increased.

Another advantage of using network inductive elements in the excitation circuit is that this further eases the impedance matching. Indeed, the value of inductance Lp, which intervenes in the imaginary part of the impedance of the excitation circuit, is minimized.

Figure 4:
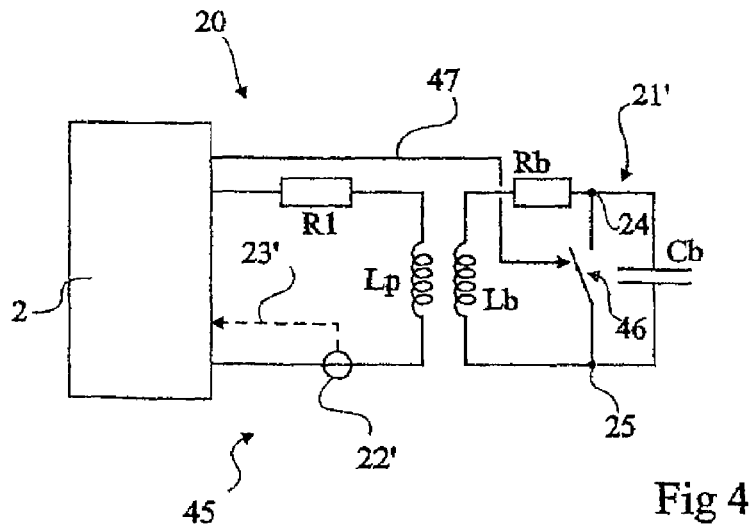
FIG. 4 shows an alternative embodiment of a terminal according to the present invention.

FIG. 4 shows another embodiment of a read and/or write terminal 45 according to the present invention. This embodiment more specifically applies to a terminal intended for operating either in relatively remote coupling with a transponder, or in very close coupling therewith. Indeed, in some applications, it is desired to only exchange information between a transponder and the terminal when said transponder is very close to the terminal. This, to avoid that a pirate device intercepts the data exchanges. In such a case, to use a single terminal, the data exchange sequences must conventionally be adapted and software controls must be performed for an operation in very close coupling allowed to a single transponder.

FIG. 4 illustrates that the implementation of the present invention greatly eases an operation in extreme closeness of a read and/or write terminal. For this purpose, a switch 46 is provided in rejector circuit 21'. This switch is placed in parallel with inductance Lb and is intended for short-circuiting the rejector circuit and, accordingly, eliminating the coupling with excitation circuit LR. Switch 46 is controlled by circuit 2, via a connection 47.

For example, when the terminal is desired to be dedicated to an operation in extreme closeness, switch 46 is closed. In this case, a transponder that wants to exchange data with the terminal must be placed almost on the terminal's antenna to obtain a magnetic coupling with inductive element Lp. The smaller the value of this inductance, the more it will be necessary for the transponder to be close to the terminal. The operation will here be close to an operation as a transformer. When switch 46 is open, the rejector circuit performs its function and the range of the read and/or write terminal is maximum.

As an alternative, the switch is placed in series in the rejector circuit. The operation is then inverted and the opening of the switch turns off the rejector circuit. In this alternative, it will be ascertained that the series resistance of the switch is minimum.

The embodiment of FIG. 4 shows a current transformer 22' in series with inductive element Lp, and measurement signal 23' of which is sent to circuit 2. This current transformer provides a measurement of the current in the excitation circuit. Such an arrangement is here necessary at least for the operation in extreme closeness since a detection can no longer be performed by the rejector circuit. It is however possible to maintain the use of a measurement system, on the rejector circuit side, when the terminal operates in remote range.

Of course, the present invention is likely to have various alterations, modifications, and improvements which will readily occur to those skilled in the art. In particular, the sizing of the different components of a read and/or write terminal according to the present invention is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An apparatus comprising:
an antenna for generating an electromagnetic field for an electromagnetic transponder, the antenna comprising:
a first inductive element operative to connect to two terminals of application of an excitation voltage; and
a parallel resonant circuit coupled with the first inductive element to extend a range of an electromagnetic field emitted by the first inductive element, and
wherein the parallel resonant circuit comprises a second inductive element and a control switch connected to the second inductive element.

2. The antenna of claim 1, wherein the control switch is connected in parallel with the second inductive element.

3. The antenna of claim 1, wherein the control switch is connected in series with the second inductive element.

4. An apparatus comprising:
an antenna for generating an electromagnetic field for an electromagnetic transponder, the antenna comprising:
a first inductive element operative to connect to two terminals of application of an excitation voltage; and
a parallel resonant circuit coupled with the first inductive element to extend a range of an electromagnetic field emitted by the first inductive element,
wherein the parallel resonant circuit comprises a second inductive element and a control switch connected to the second inductive element,
wherein the first inductive element is formed of several inductances organized in a network, and
wherein the several inductances comprise seven planar windings.

5. The antenna of claim 4, wherein the seven windings are distributed in a honeycomb formation, such that each side of one planar winding of the seven planar windings is adjacent to a single side of each of the other six planar windings of the seven planar windings.

6. An apparatus comprising:
an antenna for generating an electromagnetic field for an electromagnetic transponder, the antenna comprising:
a first inductive element operative to connect to two terminals of application of an excitation voltage; and
a parallel resonant circuit coupled with the first inductive element to extend a range of an electromagnetic field emitted by the first inductive element,
wherein the parallel resonant circuit comprises a second inductive element and a control switch connected to the second inductive element,
wherein the first inductive element and the second inductive element are formed of planar windings, and
wherein a value of the second inductive element is greater than a value of the first inductive element.

7. An apparatus comprising:
an antenna comprising:
a first inductive element configured to connect to an excitation signal; and
a resonant circuit to extend a range of an electromagnetic field emitted by the first inductive element, the resonant circuit being configured to inductively couple to the first inductive element, the resonant circuit comprising a second inductive element and a control switch connected to the second inductive element,
wherein the first inductive element and the second inductive element each comprise a planar winding,
wherein a plane of the first inductive element and a plane of the second inductive element are substantially parallel, and
wherein the first inductive element comprises a plurality of planar windings.

8. The antenna of claim 7, wherein the planar winding of the second inductive element has a substantially same planar shape and size as a planar shape and size of a perimeter of the plurality of planar windings.

9. The antenna of claim 7, wherein at least one planar winding of the plurality of planar windings has a substantially hexagonal geometry.

10. The antenna of claim 7, wherein the plurality of planar windings includes seven planar windings, each winding of the seven planar windings having a substantially hexagonal geometry.

11. The antenna of claim 10, wherein the seven planar windings are distributed in a honeycomb formation, such that each side of one planar winding of the seven planar windings is adjacent to a single side of each of the other six planar windings of the seven planar windings.

12. An apparatus comprising:
an antenna comprising:
a first inductive element configured to connect to an excitation signal; and
a resonant circuit to extend a range of an electromagnetic field emitted by the first inductive element, the resonant circuit being configured to inductively couple to the first inductive element, the resonant circuit comprising a second inductive element and a control switch connected to the second inductive element,
wherein the first inductive element and the second inductive element each comprise a planar winding, wherein a plane of the first inductive element and a plane of the second inductive element are substantially parallel, wherein the resonant circuit further comprises a first capacitor, and wherein the first capacitor is connected in parallel to the second inductive element, and wherein a value of the first capacitor and a value of the second inductive element define a natural frequency approximately equal to a frequency of the excitation signal.

13. An apparatus comprising:
an antenna comprising:
a first inductive element configured to connect to an excitation signal; and
a resonant circuit to extend a range of an electromagnetic field emitted by the first inductive element, the resonant circuit being configured to inductively couple to the first inductive element, the resonant circuit comprising a second inductive element,
wherein the first inductive element and the second inductive element each comprise a planar winding,
wherein a plane of the first inductive element and a plane of the second inductive element are substantially parallel,
wherein the resonant circuit further comprises a first capacitor, and wherein the first capacitor is connected in parallel to the second inductive element, and
wherein the resonant circuit further comprises a switch.

14. The antenna of claim 13, wherein the switch is in parallel with the second inductive element.

15. The antenna of claim 13, wherein the switch is in series with the second inductive element.

16. An apparatus comprising:
an antenna comprising:
a first inductive element configured to connect to an excitation signal; and
a resonant circuit to extend a range of an electromagnetic field emitted by the first inductive element, the resonant circuit being configured to inductively couple to the first inductive element, the resonant circuit comprising a second inductive element and a control switch connected to the second inductive element,
wherein the first inductive element and the resonant circuit are disposed on a same substrate.

17. An apparatus comprising:
an antenna comprising:
a first inductive element configured to connect to an excitation signal; and a resonant circuit to extend a range of an electromagnetic field emitted by the first inductive element, the resonant circuit being configured to inductively couple to the first inductive element, the resonant circuit comprising a second inductive element and a control switch connected to the second inductive element,
wherein the first inductive element and the resonant circuit are disposed on a same substrate wherein the first inductive element comprises a plurality of planar windings.

18. The antenna of claim 17, wherein the second inductive element comprises a planar winding, and wherein the planar winding of the second inductive element has a substantially same planar shape and size as a planar shape and size of a perimeter of the plurality of planar windings.

19. The antenna of claim 17, wherein at least one planar winding of the plurality of planar windings has a substantially hexagonal geometry.

20. The antenna of claim 17, wherein the plurality of planar windings includes seven planar windings, each winding of the seven planar windings having a substantially hexagonal geometry.

21. The antenna of claim 20, wherein the seven planar windings are distributed in a honeycomb formation, such that each side of one planar winding of the seven planar windings is adjacent to a single side of each of the other six planar windings of the seven planar windings.

22. An apparatus comprising:
an antenna comprising:
a first inductive element configured to connect to an excitation signal; and
a resonant circuit to extend a range of an electromagnetic field emitted by the first inductive element, the resonant circuit being configured to inductively couple to the first inductive element, the resonant circuit comprising a second inductive element and a switch connected to the second inductive element,
wherein the first inductive element and the resonant circuit are disposed on a same substrate,
wherein the resonant circuit further comprises a first capacitor, and wherein the first capacitor is connected in parallel to the second inductive element, and
wherein a value of the first capacitor and a value of the second inductive element define a natural frequency approximately equal to a frequency of the excitation signal.

23. The antenna of claim 22, wherein the switch is in parallel with the second inductive element.

24. The antenna of claim 22, wherein the switch is in series with the second inductive element.

25. A terminal for generating a high-frequency electromagnetic field for at least one transponder entering this field, the terminal comprising:
an antenna for generating an electromagnetic field for the at least one transponder, the antenna comprising:
a resonant circuit and an excitation circuit magnetically coupled to the resonant circuit, the excitation circuit including a first inductive element and having no capacitive element, said resonant circuit including a second inductive element and a control switch connected to the second inductive element, a value of which is chosen to be greater than a value of the first inductive element with a ratio depending on a desired field amplification for extending a range of an electromagnetic field emitted by the excitation circuit.

26. The terminal of claim 25, further comprising a current transformer connected to the resonant circuit.

27. The terminal of claim 25, further comprising a current transformer connected to the excitation circuit.

28. The terminal of claim 25, wherein the first inductive element comprises seven planar windings.

29. The terminal of claim 28, wherein the seven windings are distributed in a honeycomb formation, such that each side of one planar winding of the seven planar windings is adjacent to a single side of each of the other six planar windings of the seven planar windings.

30. The terminal of claim 25, wherein the control switch is connected in series with the second inductive element.

31. The terminal of claim 25, wherein the control switch is connected in parallel with the second inductive element.

32. The terminal of claim 25, wherein the resonant circuit is formed of the second inductive element and of a capacitive element in parallel, and is tuned to the frequency of an excitation signal of the first inductive element.

* * * * *